S. A. BULLOCK.
RAILWAY CAR.
APPLICATION FILED NOV. 20, 1915.
1,181,833.
Patented May 2, 1916.
2 SHEETS—SHEET 1.
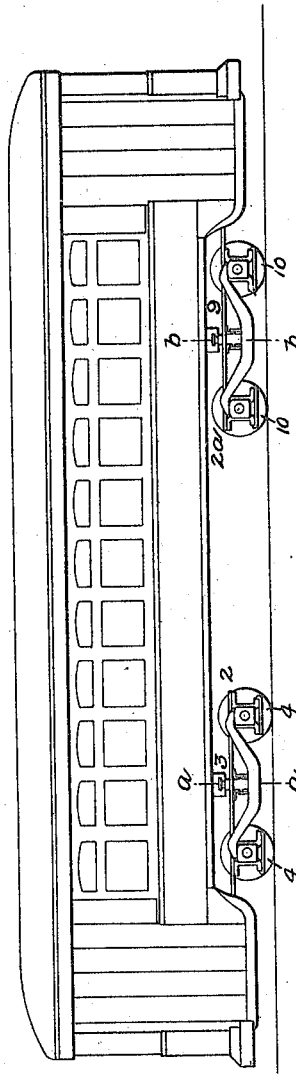
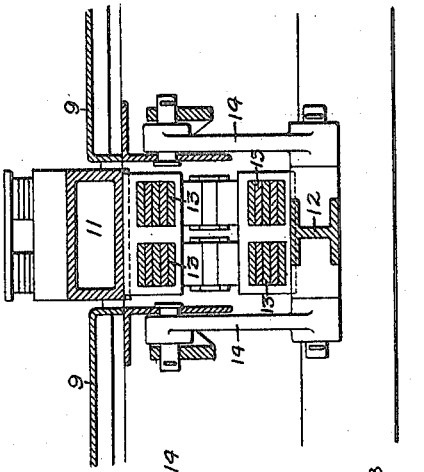
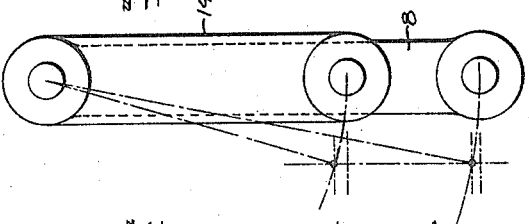
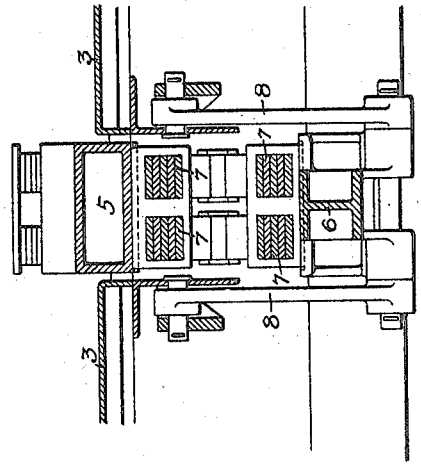
Inventor:—
Samuel A. Bullock
by his Attorneys.
Howson & Howson

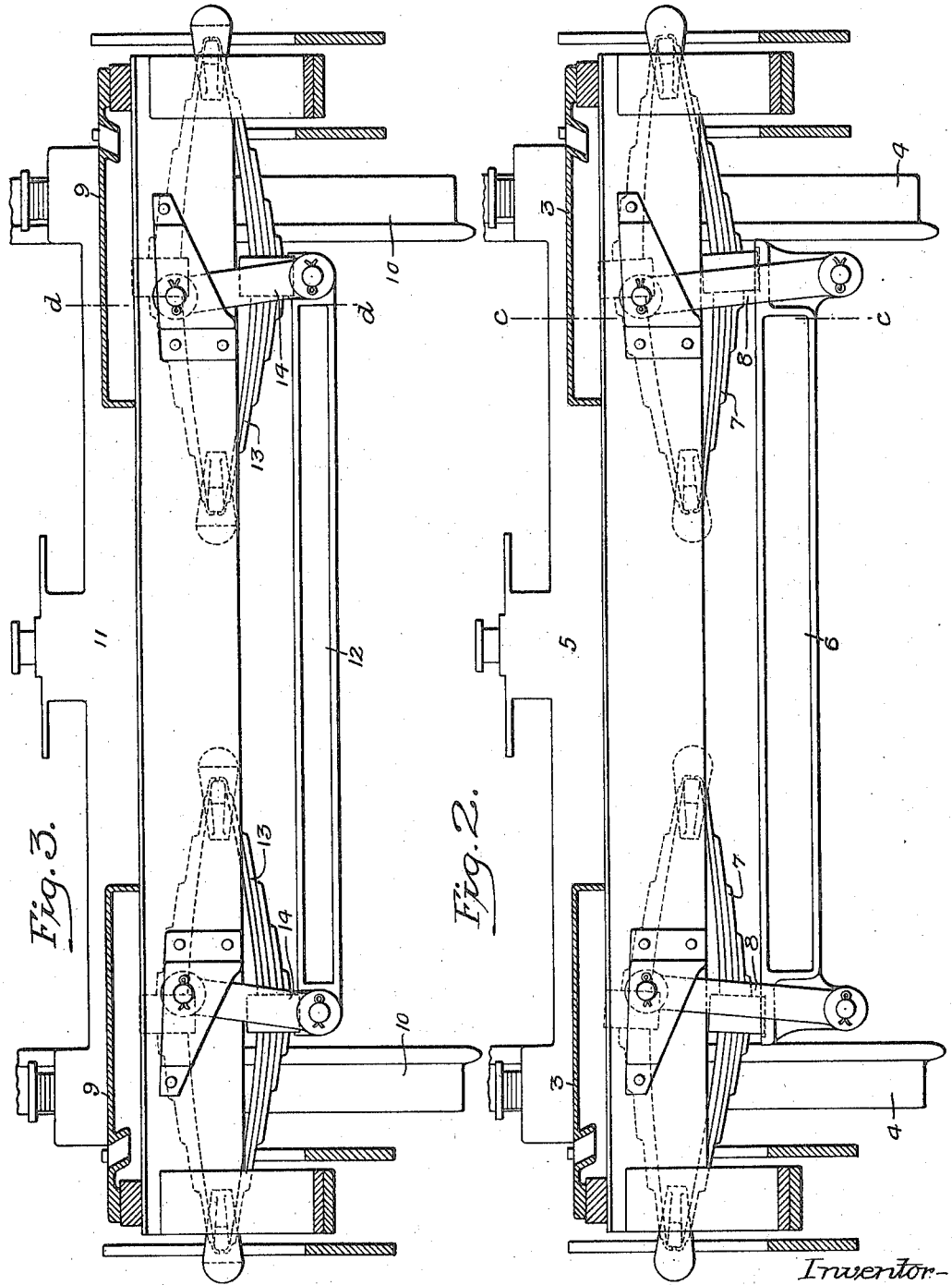

UNITED STATES PATENT OFFICE.

SAMUEL A. BULLOCK, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

RAILWAY-CAR.

1,181,833.  Specification of Letters Patent.  Patented May 2, 1916.

Application filed November 20, 1915. Serial No. 62,576.

*To all whom it may concern:*

Be it known that I, SAMUEL A. BULLOCK, a citizen of the United States, residing in Philadelphia, Pennsylvania, have invented certain Improvements in Railway-Cars, of which the following is a specification.

The object of my invention is to reduce the nosing action of a car, whether self propelled or used as a trailer either as a unit or multiple unit. Cars of this character, as formerly constructed, when driven even at moderate speeds, nose to such an extent that the occupants of the car are rendered uncomfortable. By my invention the synchronism of the end swing of the car body is broken up and a very pleasant lateral motion is produced, which is opposed to the so-called objectionable nosing.

In the accompanying drawings: Figure 1 is a side view of a passenger car of the electric type illustrating my invention; Fig. 2 is a transverse section on the line *a—a*, Fig. 1, through one truck; Fig. 3 is a transverse sectional view on the line *b—b*, Fig. 1, through the other truck; Fig. 4 is a sectional view on the line *c—c*, Fig. 2; Fig. 5 is a sectional view on the line *d—d*, Fig. 3, and Fig. 6 is a diagrammatic view of the links.

Referring to the drawings, 1 is the body of the car, which may be of any desired shape. In the present instance, 2 is one truck and 2ª is the other truck. The truck 2 has the ordinary frame 3, wheels 4, bolster 5, spring plate 6 and springs 7. The spring plate is connected to the frame by long links 8. The truck 2ª has a frame 9, wheels 10, bolster 11, spring plate 12, springs 13 and short links 14. The car is pivotally mounted on the bolsters of these trucks in the ordinary manner.

It will be understood that while I have shown a particular type of truck, the type may be modified without departing from the spirit of the invention. The essential feature of the invention resides in the fact that the swing links of one truck are of greater length than those of the other truck, so that when the car is moving and the bolster begins to swing on the frame of the trucks, the swing of one truck will be different from the swing of the other. This movement breaks up the synchronism of the swinging of the car body and instead of the usual nosing action, which is produced when the links of both trucks are of the same length, a pleasant floating action is produced which reduces to a minimum the angle between the center line of the track and the center line passing through the king pins of the car.

While I have illustrated the links of each truck independently connected to the pivot pins on the frame and on the spring plate, the links may be in the form of straps or other well known substitutes for the links shown in the drawings to cause one end of the car body to swing on a greater radius than the other end thereof.

I claim:

1. The combination in a car, of a body portion and two independent trucks, one located at one end of the car and the other at the opposite end thereof; and means for causing one end of the car to swing on a greater radius than the other end thereof.

2. The combination in a car, of a body portion; two independent swing trucks on which the car body is mounted, one truck being located at one end of the car and the other at the opposite end thereof, each truck having swing links, the links of one truck being of a greater length than those of the other truck so that one end of the car will swing on a greater radius than the other end thereof.

3. The combination in a car, of a body portion; two independent swing trucks on which the car body is mounted, each truck having a transversely movable bolster; and links connecting the bolster with the frame of the truck, the links of one truck being of a greater length than those of the other truck so that one end of the car is caused to swing on a greater radius than the other end thereof.

4. The combination in a car, of a body portion; two independent swing trucks on which the car body is mounted, each truck having a transversely movable bolster pivotally connected to the body portion and links connecting the bolster with the frame of each truck, the links of each truck being of the same length, but the links of one truck being of a greater length than those of the other truck so that one end of the car is caused to swing on a greater radius than the other end thereof.

SAMUEL A. BULLOCK.

Copies of this patent may be obtained for five cents each, by addressing the "Commissioner of Patents, Washington, D. C."